United States Patent

O'Keefe et al.

[15] 3,668,114

[45] June 6, 1972

[54] STABILIZED AMORPHOUS SILICA-ALUMINA CATALYTIC CRACKING CATALYSTS

[72] Inventors: William H. O'Keefe, Creve Coeur, Mo.; James H. Colvert, Houston; Gerald V. Nelson, Nederland; Douglas J. Youngblood, Groves, all of Tex.

[73] Assignee: Texaco Inc., New York, N.Y.

[22] Filed: Dec. 28, 1970

[21] Appl. No.: 102,238

Related U.S. Application Data

[63] Continuation-in-part of Ser. No. 728,617, May 13, 1968, abandoned.

[52] U.S. Cl. .......................................208/120, 252/455 R
[51] Int. Cl. .........................................C10g 11/02, B01j 11/40
[58] Field of Search ..............................208/120; 252/455 R

[56] References Cited

UNITED STATES PATENTS

| | | | |
|---|---|---|---|
| 2,982,719 | 5/1961 | Gilbert et al. | 208/120 |
| 3,335,099 | 8/1967 | Weisz | 252/455 |

*Primary Examiner*—Delbert E. Gantz
*Assistant Examiner*—G. E. Schmitkons
*Attorney*—Thomas H. Whaley and Carl G. Ries

[57] ABSTRACT

There is provided a method for improving the attrition resistance and heat stability of a silica-alumina fluid catalytic cracking catalyst where the catalyst contains up to 35 weight percent alumina by treating the catalyst with steam such that the catalysts stability factor is increased to a value of at least 12.5. The above treatment provides an improved fluid catalytic cracking catalyst for utilization for the cracking of a hydrocarbon charge under the catalytic cracking conditions.

10 Claims, No Drawings

STABILIZED AMORPHOUS SILICA-ALUMINA CATALYTIC CRACKING CATALYSTS

This application is a continuation-in-part of our copending application Ser No. 728,617 filed May 13, 1968, and now abandoned.

This invention relates to the fluid catalytic conversion of hydrocarbon oils into lower boiling normally liquid products and to improved catalysts for carrying out said conversion. In particular, this invention relates to silica-alumina fluid catalytic cracking catalysts characterized by improved heat stability and attrition resistance. This invention further relates to a method for treating such catalysts and to hydrocarbon conversion processes employing such catalysts.

The cracking of heavier petroleum fractions into lighter and more valuable constituents has previously been accomplished by the use of elevated temperatures customarily referred to as thermal cracking. In more recent times, natural and synthetic materials possessing catalytic properties have been employed to promote hydrocarbon cracking. In addition to possessing hydrocarbon cracking ability the catalyst must additionally embody other characteristics such as the ability to convert a given charge stock to a variety of desired and preselected products under particular conditions of temperature, pressure and space rate normally termed activity. Again, while the catalyst's activity is of prime consideration, the processing techniques employed for hydrocarbon conversion also play a major role in determining the characteristics required of a given catalyst.

Conversion of hydrocarbons by the fluid catalytic cracking technique has presented hydrocarbon processors with a variety of problems. For example, in many commercial fluid catalytic cracking units, separate cracking reactors and regenerators are employed with spent catalyst from the reactor being pneumatically transported into the regenerator and therein exposed to elevated temperatures of from 1,000° to 1300° F. Catalyst regeneration at elevated temperatures is necessitated by virtue of the formation of heavy undesirable carbonaceous materials, commonly referred to as coke, onto the catalyst during the cracking operation which formation interferes with catalytic activity. Coking proceeds quite rapidly upon catalyst introduction into the hydrocarbon conversion zone thereby rapidly causing partial catalyst deactivation. Consequently, to maintain a high level of catalyst activity in the reactor, the catalyst must be systematically removed from the reaction zone to a regeneration zone where catalyst activity is restored through a burning off of the carboneous deposits and the decoked catalyst is subsequently returned to the reaction zone. High regenerative temperatures are, however, deleterious to conventional silica-alumina catalysts. Particularly deleterious is overheating of the catalyst in that portion of the regenerator where spent catalyst first contacts air richest in oxygen resulting in "hot spots" in the order of 1,650° F. and higher. Such "hot spots" lead to severe catalyst deactivation and loss of catalyst activity.

While substantial coke formation on catalysts during hydrocarbon conversion presents costly regeneration deactivation problems, the catalyst nevertheless must possess further physical attributes which enable it to withstand the severe exposure and handling described above. A highly desirable physical attribute of a commercial catalyst is high attrition resistance, i.e., its ability to resist abrading and fragmenting into fine material. Such finely divided catalytic material, while in fact possessing high activity and in great part originating through the handling and transport of fresh catalyst, cannot be retained in the cracking units and is lost in substantial quantity via the regenerator stack gases and to a lesser extent through fractionator bottoms. Catalyst depletion by virtue of attrition is consequently reflected in a less economical operation. Moreover, the processing equipment itself when exposed to the finely divided material undergoes excessive wear frequently causing costly shutdowns and repairs.

To deter attrition and heat deactivation of fluid catalytic cracking catalysts, the art has previously proposed the compounding of active catalytic material with a variety of binding materials. While compounding provided the catalytic material with some measure of attrition resistance such characteristic was provided at the expense of catalytic activity.

It is therefore an object of this invention to provide fluid catalytic cracking catalysts with improved attrition resistance and stability towards high regenerative temperatures.

Another object of this invention is to provide a method for improving the attrition resistance and heat stability of fluid catalytic cracking catalysts.

A further object of this invention is to provide a hydrocarbon conversion process employing improved fluid catalytic cracking catalysts.

Other objects and advantages will become apparent from a reading of the following detailed description and examples.

Broadly, this invention contemplates a method for improving the attrition resistance and heat stability of a silica-alumina fluid catalytic cracking catalyst which comprises providing a conventional silica-alumina catalyst containing up to 35 weight percent alumina and treating this catalyst with steam such that the catalyst's Stability Factor is increased to a value of at least 12.5. The Stability Factor is defined as 100 times the catalyst pore volume in cubic centimeters per gram divided by the cube root of the catalyst surface area in square meters per gram.

$$\text{Stability Factor} = \frac{100 \times (\text{Pore volume, cc./gm.})}{\sqrt[3]{(\text{Surface area, M}^2/\text{gm.})}}$$

In another embodiment, this invention contemplates an improved fluid catalytic cracking catalyst characterized by enhanced attrition resistance and heat stability, by treating a conventional silica-alumina catalyst containing up to 35 weight percent alumina with steam such that the catalyst is provided with a Stability Factor the value of which is at least 12.5.

In a further embodiment, this invention contemplates a process for the cracking of a hydrocarbon charge by contacting the charge under catalytic cracking conditions with a silica-alumina cracking catalyst containing up to 35 weight percent alumina, where the catalyst is treated with steam such that the catalyst's Stability Factor is increased to a value of at least 12.5

According to this invention, the improved fluid catalytic cracking materials comprise conventional silica-alumina catalysts inclusive of the synthetic or semi-synthetic varieties. In particular, the contemplated catalysts are composed of up to 35 weight percent alumina with the remainder comprising substantially silica. Generally, the applicable catalysts contain about 10 weight percent alumina although lesser amounts may be present without detracting from the scope of the instant invention. Particularly applicable are silica-alumina fluid cracking catalysts having from 12 to 30 weight percent alumina. Catalysts containing greater than 35 weight percent alumina have been found to be unresponsive to the catalyst pretreatment more fully described below. The use and preparation of such catalysts is well known in the art and any of the known types may be employed. For example, synthetic catalysts are prepared from solutions of aluminum salts and silicates by separate precipitation and subsequent mixing of gels, or by co-precipitation of gels as is well-known in the art. Semi-synthetic catalyst may be prepared by chemical combination of a peptized slurry of kaolinite particles with a silica-alumina hydrogel precursor prior to gelation and drying thereof. After preparation of the gel, for example, the material is subsequently dried at temperatures ranging from 100° to 400° F. such that loosely bound water is removed and a non-gelatinous material is recovered. This material may thereafter undergo such treatments as calcination wherein chemically bound hydrated water is driven off at temperatures in the order of 1,000° F. thereby providing a highly porous material having a high internal surface area. As an alternate method of drying, the gel may be contacted with hot gases at a temperature in the range of about 600°–1,200° F., as in a spray drier or in a rotating drying kiln.

In accordance with this invention, such synthetic or semi-synthetic silica-alumina catalysts comprising up to 35 and preferably from 12 to 30 weight percent alumina are provided with increased attrition resistance and improved stability when exposed to regenerative temperatures of 1,650° F. and higher by preconditioning the fresh catalyst prior to introduction into the hydrocarbon conversion zone. Such preconditioning comprises exposing the catalyst to temperatures ranging from 900° to 1,500° F. for a period of 0.5 to 100 hours in an environment of from 1 to 25 atmospheres of steam such that the Stability Factor of the catalyst is increased to a value of at least 12.5.

In general, the fresh catalyst is contacted in a flowing or static environment of steam and we prefer to employ flowing steam at velocities ranging from 0.1 to 15 feet per second. Within the applicable ranges stated above we preferentially operate at temperatures of from 1,000° to 1,300° F. at steam pressures of from 5 to 15 atmospheres and velocities of from 0.1 to 5 feet per second for periods of one to 24 hours. Treatments conducted in accordance with the conditions set forth above provides the catalyst with an increased Stability Factor value of at least 12.5, with values of 13.5 and higher being preferred. In another preferred embodiment the catalyst Stability Factor is increased to a value of at least 12.5 without reducing the catalyst surface area below about 130 M²/gm.

It has been found that preconditioning the fresh catalyst under the conditions prescribed above provides the catalyst with the improved characteristics heretofore described. Subsequent introduction of the pretreated catalyst into the catalytic cracking zone results in prolonged catalysts activity at high rates with concomitant reduction of attrition and a substantial reduction in carbonaceous deposit laid down on the catalyst. Moreover, the spent pretreated catalyst resumes a higher catalytic activity than untreated catalyst when reintroduced into the reaction zone after exposure to severe regeneration temperatures where "hot spots" in the order of 1,650° F. and higher are reached. Consequently, by virtue of catalysts ability to withstand high regeneration conditions and its improved propensity against fragmentation in the course of fluid catalyst cracking operations a highly efficient and economical process is realized characterized by substantial reductions in fresh catalyst addition rates and maintenance of high catalyst activity. More explicitly, in view of the catalysts resistance to fragmentation and higher activity retention, particularly its behavior upon initial introduction into the reaction and regeneration zones, fresh catalyst addition rates may be reduced up to 40 percent or higher while maintaining the level of catalyst activity. Restated, the use of presteamed conventional silica-alumina catalysts permits operation at normal addition rates while providing a substantial increase in catalyst activity or an economical operation at reduced catalyst addition rates with a maintenance of normal catalyst activity. Further, not only has the steam treatment been found to be effective when pretreating the catalyst immediately prior to actual use, but additionally such conditioning provides long term effects such that the treatment may be undertaken by a catalyst manufacturer and the catalyst stored for extended periods of time with reduction of the properties described herein.

For the purpose of more fully illustrating the nature of our invention the following examples are presented.

EXAMPLE I

Catalysts A and B representing samples of fresh commercially available silica-alumina catalysts, are identified in TABLE I below and were evaluated for activity, heat stability and attrition resistance.

TABLE I

| Catalyst | A | B |
|---|---|---|
| Properties: | | |
| Pore volume cc./g | 0.87 | 0.82 |
| Surface area m.²/g | 533 | 396 |
| Sodium, wt. percent | 0.02 | 0.02 |
| Alumina, wt. percent | 15.6 | 27.0 |
| X-ray defraction | (1) | (1) |
| Stability factor, $(100 \times PV)/\sqrt{(SA)}$ | 10.7 | 11.2 |

[1] Non-crystalline.

Fresh samples of commercial catalysts A and B above were dried and adsorbed water removed by heating initially for 2 hours at 300° F. followed by heating for 1 hour at 800° F. The catalysts were subsequently calcined in dry air at 1,000° F. for 2 hours. Samples of each catalyst were thereafter preconditioned for 3 hours at 1,150° F. under a steam pressure of 150 psig and a steam velocity of 0.1 fps. Samples of precondition and untreated catalyst were thereafter exposed to simulated regenerative conditions of 1,700° F. for 17 hours. TABLE II summarizes the results obtained.

TABLE II

| | Catalyst | | | |
|---|---|---|---|---|
| | A | | B | |
| Preconditioning | No | Yes | No | Yes |
| Prior to regenerative exposure conditions: | | | | |
| Stability factor | 10.7 | 13.7 | 11.2 | 14.5 |
| Catalyst surface area m.²/gm | 533 | 135 | 396 | 144 |
| Subsequent to regenerative exposure conditions: | | | | |
| Surface area M.²/gm | 49 | 96 | 57 | 98 |
| Activity | 16.6 | 20.0 | 18.4 | 22.0 |

Notice that the steam treatment increased catalyst heat stability and Stability Factor. Catalyst activity was evaluated with a gas oil charge stock having the following characteristics:

| | |
|---|---|
| Gravity, °API | 36.7 |
| Viscosity, SUS at 100°F. | 40.3 |
| Carbon Residue, Wt. percent | None |
| Sulfur, Wt. percent | 0.08 |
| Pour Point, °F. | 20 |
| Bromine No. | 3 |
| ASTM Distillation, °F. | |
| IBP | 444 |
| 5% | 480 |
| 10 | 493 |
| 20 | 512 |
| 30 | 526 |
| 40 | 538 |
| 50 | 522 |
| 60 | 566 |
| 70 | 582 |
| 80 | 607 |
| 90 | 646 |
| 95 | 686 |
| EP | 708 |

Essentially the charge stock consisted of special distillation range gas oil from North Texas Special Crude. The test for catalytic activity consisted of employing 400 grams of catalyst under test at the following conditions:

| | |
|---|---|
| Reaction temperature, °F. | 920 |
| Space Velocity, $W_{oil}/Hour/W_{catalyst}$ | 2.0 |
| Weight ratio: catalyst/oil | 1.0 |
| Reaction time, hour | 0.5 |

The activity was measured by fractionating the cracked liquid product to a 390° F. cut point. The activity (Texaco D + L) was calculated as 100 minus the volume percent gas oil above 390° F. recovered from the fractionator.

Two additional samples of catalyst B were dried in the manner described above. The first sample was thereafter preconditioned for 3 hours at 1,150° F. under a steam pressure of 150 psig and a steam velocity of 0.1 fps. The second sample was preconditioned for one hour at 1,050° F. under a steam pressure of 100 psig and a steam velocity of 0.1 fps. Both samples were subsequently exposed to simulated regenerative conditions of 1,725° F. for 3 hours. Table III summarizes the results obtained.

TABLE III

| Catalyst | Steam treatment temp., °F. | Stability factor prior to heat treat | Catalyst surface area prior to heat treat M.²gm. | Heat treated catalyst Surface area, M.²/gm. | Activity |
|---|---|---|---|---|---|
| B | 1,150 | 14.5 | 144 | 106 | 23.6 |
| B | 1,050 | 12.5 | 237 | 87 | 20.7 |

As can be seen, the catalyst having the highest Stability Factor after steam preconditioning also possessed the best heat stability.

Table IV below tabulates the results demonstrating that steam preconditioning at 1,150° F., 150 psig, 0.1 fps for 3 hours significantly improves the attrition resistance characteristic of the catalyst.

TABLE IV

| Catalyst | Precondi- tioning | Attrition 0-20μ | 0-40μ |
|---|---|---|---|
| B | No | 19.4 | 28.3 |
| B | Yes | 13.4 | 23.2 |

The attrition test employed is essentially as described in Ind. Eng. Chem. 41, 1206 (1949) while utilizing the micromesh sieve technique described in Petroleum Refiner Vol. 40, No. 10, pp. 139–144 (1961) to determine the fines content. The rate of attrition is defined as:

$$\frac{100 \text{ (Weight percent fines in attrited sample} - \text{Weight percent fines in original sample)}}{100 - \text{Weight percent fines in original sample}}$$

EXAMPLE II

The improvements regarding catalyst activity and attrition resistances were realized without adverse effects on catalyst selectivity or product quality. Two samples of catalyst B, from a different batch than used in Example I, were subjected to the following treatments after drying as in Example I. One sample was heat treated for 3 hours at 1,650° F. and thereafter steam treated for 3 hours at 1,150° F. under a steam pressure of 150 psig and a steam velocity of 0.1 fps. The other sample was steam treated for 3 hours at 1,150° F. under a steam pressure of 150 psig and a steam velocity of 0.1 fps. Followed by heat treatment for 3 hours at 1,725° F. Both catalyst treatments were designed to reduce the surface area and pore volumes of the catalyst to the level of those of equilibrium catalysts from commercial catalytic cracking units. The properties of the treated samples are shown in Table V.

TABLE V

| Treat- ment | Surface area, M²/gm | Pore vol- ume cc/g | Average pore diameter, angstroms | Act- ivity |
|---|---|---|---|---|
| Steam, then heat | 99 | 0.50 | 202 | 20.0 |
| Heat, then steam | 105 | 0.37 | 141 | 19.2 |

20.0

Although the heat treatment conditions used in the steam, then heat treatment of catalyst B were much more severe than that used in the heat followed by steam treatment, the former catalysts possessed a somewhat better activity after exposure. In addition, the steam pretreatment provided the simulated equilibrium catalyst with a high pore volume and average pore diameter then would otherwise be obtained in the absence of such treatment. To determine whether steam pretreatment ad-versely affects cracking selectivity at constant catalyst activity, the cracking characteristics of both samples were determined as shown in Table VI. As can be seen, both catalyst samples had essentially the same cracking selectivity.

TABLE VI

| Catalyst | B | B |
|---|---|---|
| Treatment | Steam, then heat | Heat, then steam |
| Cracking Yields | | |
| 430°F. conversion, vol. % | 45.00 | 45.00 |
| Dry gas ($C_3$ and lighter) Wt. % | 6.96 | 7.02 |
| Total Butanes, vol. % | 12.33 | 12.18 |
| DB Naphtha (430°F. EP), Vol. % | 31.20 | 31.08 |
| 430°F. + gas oil, vol. % | 55.00 | 55.00 |
| Coke, Wt. % | 2.36 | 2.42 |

The larger pore diameter steam pretreated catalyst in Table V is beneficial in cracking larger hydrocarbon molecules than cracked in Table VI such as exist in reduced crudes.

Catalytic cracking yields in Table VI were determined on a continuous fluidized bed pilot unit charging a gas oil having the following characteristics:

| Gravity, °API | 30.9 |
|---|---|
| Viscosity at 100°F. centistokes | 8.93 |
| Carbon Residue, Wt. % | 0.05 |
| Sulfur, Wt. % | 0.53 |
| Bromine No. | 3 |
| ASTM distillation, °F. | |
| IBP | 453 |
| 10 | 528 |
| 30 | 579 |
| 50 | 625 |
| 90 | 747 |

The following catalytic cracking conditions were employed in catalyst evaluation:

| Reactor Temperature, °F. | 920 |
|---|---|
| Space Velocity, W Oil/Hour/W Catalyst | 1.8 |
| Weight Ratio: Catalyst/Oil | 7 |
| Reaction Time, Minutes | 4.8 |

EXAMPLE III

A series of runs demonstrates that lower steaming temperatures, often utilized in prior art processes, do not impart to amorphous silica-alumina catalysts the beneficial properties obtained by the process of our invention. Samples of catalyst C, substantially the same as catalyst B but having slightly different properties, as shown in Table VII below, were subjected to a variety of treatments.

TABLE VII

| Properties | Catalyst C |
|---|---|
| Pore volume, cc/g | 0.86 |
| Surface area, M²/g | 396 |
| Alumina content, weight % | 28.4 |
| Stability factor | 11.7 |

Fresh samples of catalyst C were dried as in Example I and subjected to simulated regenerative conditions. Each sample was then evaluated for activity (Texaco D+L) and selectivity. Selectivity is defined as the volume ratio of debutanized naphtha yield to gas oil conversion as measured in the Texaco D+L test. The results are shown in Table VIII below.

TABLE VIII

| Run No. | 1 | 2 | 3 | 4 |
|---|---|---|---|---|
| Steaming conditions | No Steaming | 400°F 234 psig 2 hours | 450°F 394 psig 2 hours | 500°F 712 psig 1 hour |
| Simulated | 17 hours | 17 hours | 17 hours | 17 hours |

| regeneration | at 1700°F | at 1700°F | at 1700°F | at 1700°F |
|---|---|---|---|---|
| Activity | 21.7 | 20.7 | 16.8 | 20.2 |
| Selectivity | 0.71 | 0.66 | 0.70 | 0.68 |

Subjecting catalyst C to the steam treating conditions of our process, for example, steam at 150 psig and 1,150° F. for 3 hours, and then exposing it to the simulated regenerative conditions of these runs will produce a catalyst having a higher activity and selectivity than the catalyst of Run 1.

This series of runs shows that the steaming conditions of Runs 2, 3 and 4 did not improve the heat stability of the catalyst and in fact produced a lower activity and selectivity than that exhibited by the catalyst of Run 1 which received no steam treatment.

We claim:

1. A method for improving the attrition resistance and heat stability of a silica-alumina fluid catalytic cracking catalyst which comprises treating an amorphous silica-alumina catalyst containing up to 35 weight percent alumina by contacting said catalyst with steam at a temperature of from about 900° to 1,500° F. for a period of at least one-half hour under a steam pressure of from about 1 to 25 atmospheres whereby said catalyst's Stability Factor is increased to a value of at least 12.5.

2. A method according to claim 1 wherein said catalyst is treated at a temperature of from about 1,000° to 1,300° F. for a period of 1 to 24 hours under a steam pressure of from about 5 to 15 atmospheres.

3. A method according to claim 1 wherein said catalyst is treated with flowing steam, said steam flowing at a velocity of from 0.1 to 15 feet per second.

4. A method according to claim 1 wherein said catalyst contains from 10 to 35 weight percent alumina and where said catalyst is treated at a temperature of from about 1,000° to 1,300° F. for a period of 1 to 24 hours under a steam pressure of from about 5 to 15 atmospheres flowing at a velocity of from 0.1 to 15 feet per second.

5. An improved amorphous silica-alumina fluid catalytic cracking catalyst prepared by the method of claim 1.

6. An improved catalyst according to claim 5 wherein said catalyst contains from 10 to 35 weight percent alumina.

7. An improved catalyst according to claim 5 wherein said catalyst has a surface area of at least 130 M²/gm.

8. An improved catalyst according to claim 5 wherein said Stability Factor is at least 13.5.

9. An improved amorophous silica-alumina fluid cracking catalyst prepared by the method of claim 4.

10. A process for the fluid catalytic cracking of a hydrocarbon charge which comprises contacting said charge under fluid catalytic cracking conditions with a catalyst comprising an amorphous silica-alumina catalyst prepared by the method of claim 1.

* * * * *